(12) United States Patent
Suryanarayana et al.

(10) Patent No.: US 11,995,452 B2
(45) Date of Patent: May 28, 2024

(54) FIRMWARE MEMORY MAP NAMESPACE FOR CONCURRENT CONTAINERS

(71) Applicant: Dell Products L.P., Round Rock, TX (US)

(72) Inventors: Shekar Babu Suryanarayana, Bangalore (IN); Vivek Viswanathan Iyer, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 261 days.

(21) Appl. No.: 17/454,396

(22) Filed: Nov. 10, 2021

(65) Prior Publication Data

US 2023/0146526 A1 May 11, 2023

(51) Int. Cl.
G06F 9/445 (2018.01)
G06F 8/65 (2018.01)
G06F 9/455 (2018.01)

(52) U.S. Cl.
CPC ............ *G06F 9/44505* (2013.01); *G06F 8/65* (2013.01); *G06F 9/45558* (2013.01); *G06F 2009/45583* (2013.01)

(58) Field of Classification Search
CPC .... G06F 9/44505; G06F 8/65; G06F 9/45558; G06F 2009/45583; G06F 9/5061
See application file for complete search history.

(56) References Cited

U.S. PATENT DOCUMENTS

| | | | | |
|---|---|---|---|---|
| 9,471,536 | B1* | 10/2016 | Marr | G06F 8/654 |
| 2008/0098392 | A1* | 4/2008 | Wipfel | G06F 9/468 |
| | | | | 718/1 |
| 2012/0291021 | A1* | 11/2012 | Banerjee | G06F 9/45558 |
| | | | | 717/173 |
| 2016/0342439 | A1* | 11/2016 | Woerndle | H04L 61/2596 |
| 2020/0233689 | A1* | 7/2020 | Neginhal | G06F 3/067 |
| 2023/0101776 | A1* | 3/2023 | Beveridge | G06F 9/44505 |
| | | | | 718/1 |

* cited by examiner

*Primary Examiner* — Jaweed A Abbaszadeh
*Assistant Examiner* — Hyun Soo Kim
(74) *Attorney, Agent, or Firm* — Norton Rose Fulbright US LLP

(57) ABSTRACT

An information handling system may concurrently execute a first container and a second container. The information handling system may access one or more first firmware settings stored in a first portion of a memory of the information handling system. The one or more first firmware settings may be first firmware settings for one or more resources allocated to the first container. One or more first firmware parameters for the first container may be adjusted based, at least in part, on the one or more first firmware settings. The information handling system may cress one or more second firmware settings stored in a second portion of the memory of the information handling system, different from the first portion of the memory. The one or more second firmware settings may be for one or more resources allocated to the second container. One or more second firmware parameters for the second container may be adjusted based, at least in part, on the one or more second firmware settings.

20 Claims, 8 Drawing Sheets

FIRMWARE MEMORY MAP NAMESPACE FOR CONCURRENT CONTAINERS

FIELD OF THE DISCLOSURE

The present disclosure generally relates to information handling systems, and more particularly relates to container-specific setting storage in information handling systems.

BACKGROUND

As the value and use of information increase, individuals and businesses seek additional ways to process and store information. One option is an information handling system. An information handling system generally processes, compiles, stores, and/or communicates information or data for business, personal, or other purposes. Because technology and information handling needs may vary between different applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, reservations, enterprise data storage, or global communications. In addition, information handling systems may include a variety of hardware and software resources that may be configured to process, store, and communicate information and may include one or more computer systems, data storage systems, and networking systems.

Through implementation of virtualization, an information handling system, or group of information handling systems, may allow multiple users to securely and concurrently use the same information handling system for different tasks. Virtualization may allow hardware components of an information handling system to be allocated for use by multiple containerized user instances. For example, cloud-native information handling systems can allow multiple users to connect through the cloud and concurrently execute tasks using a cloud-based information handling system, such as through concurrent instances of one or more operating systems executed by the information handling system. Containers, for example, may be used to allow multiple users to concurrently execute different instances of an operating system, or multiple different operating systems, using a remote cloud-based information handling system, such as a server or group of servers. Such containers, and users, may have different requirements for the remote cloud-based information handling system, such as different needs for hardware or firmware resources, configurations, and parameters. Such different needs can lead to conflicts, such as when a first container adjusts firmware settings and parameters of the cloud-based information handling system that impact other containers, executed by the information handling system, requiring different firmware settings and parameters. Adjustments made to firmware settings and parameters by one container that conflict with requirements of a concurrently executed container can result in container reset, or even hanging of a virtualization agent resulting in a full platform reboot. Such resetting and/or rebooting can increase information handling system downtime, negatively impacting a user experience.

Shortcomings mentioned here are only representative and are included simply to highlight that a need exists for improved information handling systems. Embodiments described herein address certain shortcomings but not necessarily each and every one described here or known in the art. Furthermore, embodiments described herein may present other benefits than, and be used in other applications than, those of the shortcomings described above.

SUMMARY

An information handling system executing multiple containers concurrently may provide separate firmware memory map namespaces for the containers, to provide each concurrently executed container with a portion of a firmware memory of the information handling system for storing firmware settings specific to each respective container. The information handling system may adjust firmware parameters, such as throttling or frequency of a central processing unit (CPU) allocated to each container, using each container's respective set of firmware settings. Providing separate firmware memory map namespaces for concurrently executed containers can thus allow separate firmware parameter configurations for the concurrently executed containers. Such container-specific firmware settings can prevent a first container from overwriting information handling system-wide firmware parameters that may negatively impact performance of other concurrently executed containers, such as by causing concurrently executed containers to reset, hang, and/or initiate a full information handling system reboot. Furthermore, such container-specific firmware memory map namespaces may provide enhanced security in information handling systems concurrently executing multiple containers, by allowing such information handling systems to include signature verification for container-specific firmware memory map namespaces when a container attempts to access firmware settings stored in a container-specific namespace. Thus, container-specific firmware memory map namespaces for concurrently executed containers may enhance a user experience by decreasing information handling system downtime and enhancing information handling system security.

A method for concurrent container execution by an information handling system may include accessing, by the information handling system, one or more first firmware settings stored in a first portion of a memory of the information handling system. The one or more first firmware settings may, for example, be first firmware settings for a first container executed by the information handling system. For example, the first container may access one or more stored first firmware settings to adjust one or more first firmware parameters for the first container. The first portion of the memory may, for example, be a firmware memory map namespace allocated to the first container. For example, accessing the one or more first firmware settings may comprise accessing, by the first container, the firmware memory map namespace allocated to the first container. The one or more first firmware settings for the first container may be included in a node-specific virtual data pool comprising the one or more first firmware settings, and the first container may use a firmware redirection virtual node to access the node-specific virtual data pool. In some embodiments, a setting of the one or more first firmware settings may include an indicator of a location in the memory, or another memory, of the information handling system at which a BIOS attribute associated with the setting is stored. For example, each of the firmware settings may correspond to a BIOS attribute of the information handling system, such as a frequency of a CPU of the information handling system allocated to the container with which the firmware setting is associated or a throttling of such a CPU. Thus, firmware settings of a container stored in a container-specific firmware memory map namespace for the first container may provide the container of the information handling system with information for adjusting firmware parameters related to the first container.

The information handling system may also access one or more second firmware settings stored in a second portion of the memory of the information handling system, different from the first portion of the memory of the information handling system. The one or more second firmware settings may be firmware settings for a second container executed by the information handling system concurrently with the first container. The second portion of the memory may, for example, be a firmware memory map namespace allocated to the second container. Thus, concurrently executed containers may each be allocated a firmware memory map namespace in a memory, such as a firmware memory, of the information handling system, for storing firmware settings. The node-specific virtual data pool may also include the firmware memory map namespace allocated to the second container, and thus may include the one or more second firmware settings.

The information handling system may adjust one or more first firmware parameters for the first container based, at least in part, on the one or more first firmware settings and may adjust one or more second firmware parameters for the second container based, at least in part, on the one or more second firmware settings. The one or more first firmware parameters may be one or more first firmware parameters for one or more resources, such as hardware, software, and firmware components, allocated to the first container, and the one or more second firmware parameters may be one or more second firmware parameters for one or more resources, such as hardware, software, and firmware components, allocated to the second container. The one or more first firmware parameters may, for example, include one or more first basic input/output system (BIOS) attributes, and the one or more second firmware parameters may, for example, include one or more second BIOS attributes. BIOS attributes may, for example, include a central processing unit (CPU) throttling attribute, a frequency attribute, a virtualization technology for directed input/output (VT-D) attribute, an input-output memory management unit (IOMMU) attribute, a performance state (P-state) attribute, a turbo capability attribute, a power attribute, a configuration thermal design power (TDP) attribute, a cache attribute, a direct connect interface (DCI) attribute, a CPU exception attribute, a gaussian and neural accelerator (GNA) attribute, a dedicated graphics processing unit (DGPU) attribute, an integrated graphics processing unit (IGPU) attribute, a self-encrypting drive (SED) attribute, a WiFi attribute, a Bluetooth attribute, or other attributes. For example, a BIOS attribute adjusted based on a firmware setting of a first container executed by the information handling system may be a frequency of a CPU allocated to the first container. Thus, container-specific firmware parameters stored in container-specific firmware memory map namespaces may be used to adjust firmware parameters, such as BIOS attributes, of the information handling system associated with the respective containers.

In some embodiments, a user of a container, such as an administrator, may update one or more firmware settings, such as increasing a CPU frequency for the container. The information handling system may receive an instruction to update a firmware setting of the one or more first firmware settings for the first container. The information handling system may then update the firmware setting. For example, the first container may update a firmware setting stored in the container-specific firmware memory map namespace according to the received instruction. The information handling system may then adjust a firmware parameter of one or more firmware parameters for the container based on the update to the first firmware setting. Such an adjustment may be performed without adjusting corresponding firmware parameters associated with other containers concurrently executed by the information handling system. For example, a frequency of a CPU allocated to the first container may be adjusted without adjusting frequencies of other CPUs of the information handling system allocated to other containers. Thus, container-specific firmware parameters may be adjusted with minimal impact on performance of other containers of the information handling system.

Furthermore, the container-specific firmware memory map namespaces may allow individualized rollbacks of container-specific firmware settings sets. For example, an information handling system may detect an update to a BIOS of the information handling system. The information handling system may determine that a container would function better with a different set of firmware settings based on the update to the BIOS. Thus, the information handling system may access one or more third firmware settings stored in a third portion of the memory of the information handling system. The one or more third firmware settings may be third firmware settings for the first container identified for the updated version of the BIOS. For example, the information handling system may store multiple firmware setting sets for a container in a container-specific firmware memory map namespace of the information handling system, and one or more of the firmware setting sets may be associated with different firmware versions of an information handling system, such as different versions of a BIOS of the information handling system. For example, firmware setting sets for a container may be stored for one or more old versions of a BIOS of the information handling system. Thus, when a version of a BIOS, or other firmware element, is rolled back to a prior version, the firmware setting set for the prior version may be accessed and implemented for the container. Some containers, however, may not require adjustment of firmware setting sets based on a change in a firmware version, and thus may continue to use the same set of firmware settings even when a firmware version is changed.

Use of container-specific firmware settings may allow for different versions of a firmware to be executed by different concurrently executed containers. In some embodiments, a firmware version may be rolled back for a first container while maintaining execution of a current firmware version for a second container. For example, an information handling system may encounter errors with respect to an updated firmware, such as an updated BIOS, when executed for container, but not for other containers. Thus, an information handling system may execute a first firmware version for a first container, wherein the first firmware version is stored in a third portion of the memory of the information handling system. Furthermore, the information handling system may execute a second firmware version for a second container, and the second firmware version may be stored in a fourth portion of the memory of the information handling system. The second firmware version may be different from the first firmware version. For example, the information handling system may determine to roll back a firmware version of the second container from the first firmware version to the second firmware version before executing, by the second container, the second firmware version. Thus, the second firmware version for the second container may be executed, by the information handling system, concurrently with the first firmware version for the first container.

In some embodiments, a portion of a memory allocated for storage of firmware settings for a container, such as a firmware memory map namespace, may be signed to allow for enhanced security of the portion of the memory. Thus, an information handling system may verify a signature of a first container before accessing the one or more firmware settings stored in the first portion of the memory, such as before allowing the first container to access the one or more settings stored in the first portion of the memory. Access to the one or more first firmware settings by the first container may, for example, be based on verification of a signature of the first container.

In some embodiments, an information handling system may include a memory and a processor for performing the methods described herein. A computer program product may include a non-transitory computer-readable medium including instructions for causing an information handling system to perform the method described herein.

The foregoing has outlined rather broadly certain features and technical advantages of embodiments of the present invention in order that the detailed description that follows may be better understood. Additional features and advantages will be described hereinafter that form the subject of the claims of the invention. It should be appreciated by those having ordinary skill in the art that the conception and specific embodiment disclosed may be readily utilized as a basis for modifying or designing other structures for carrying out the same or similar purposes. It should also be realized by those having ordinary skill in the art that such equivalent constructions do not depart from the spirit and scope of the invention as set forth in the appended claims. Additional features will be better understood from the following description when considered in connection with the accompanying figures. It is to be expressly understood, however, that each of the figures is provided for the purpose of illustration and description only and is not intended to limit the present invention.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

DETAILED DESCRIPTION OF DRAWINGS

The following description in combination with the Figures is provided to assist in understanding the teachings disclosed herein. The following discussion will focus on specific implementations and embodiments of the teachings. This focus is provided to assist in describing the teachings and should not be interpreted as a limitation on the scope or applicability of the teachings. However, other teachings can certainly be used in this application. The teachings can also be used in other applications and with several different types of architectures.

For purposes of this disclosure, an information handling system (IHS) may include any instrumentality or aggregate of instrumentalities operable to compute, determine, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, a two-in-one laptop/tablet computer, mobile device (e.g., personal digital assistant (PDA), smart phone, tablet computer, or smart watch), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more virtual or physical buses operable to transmit communications between the various hardware and/or software components.

Figure 1:
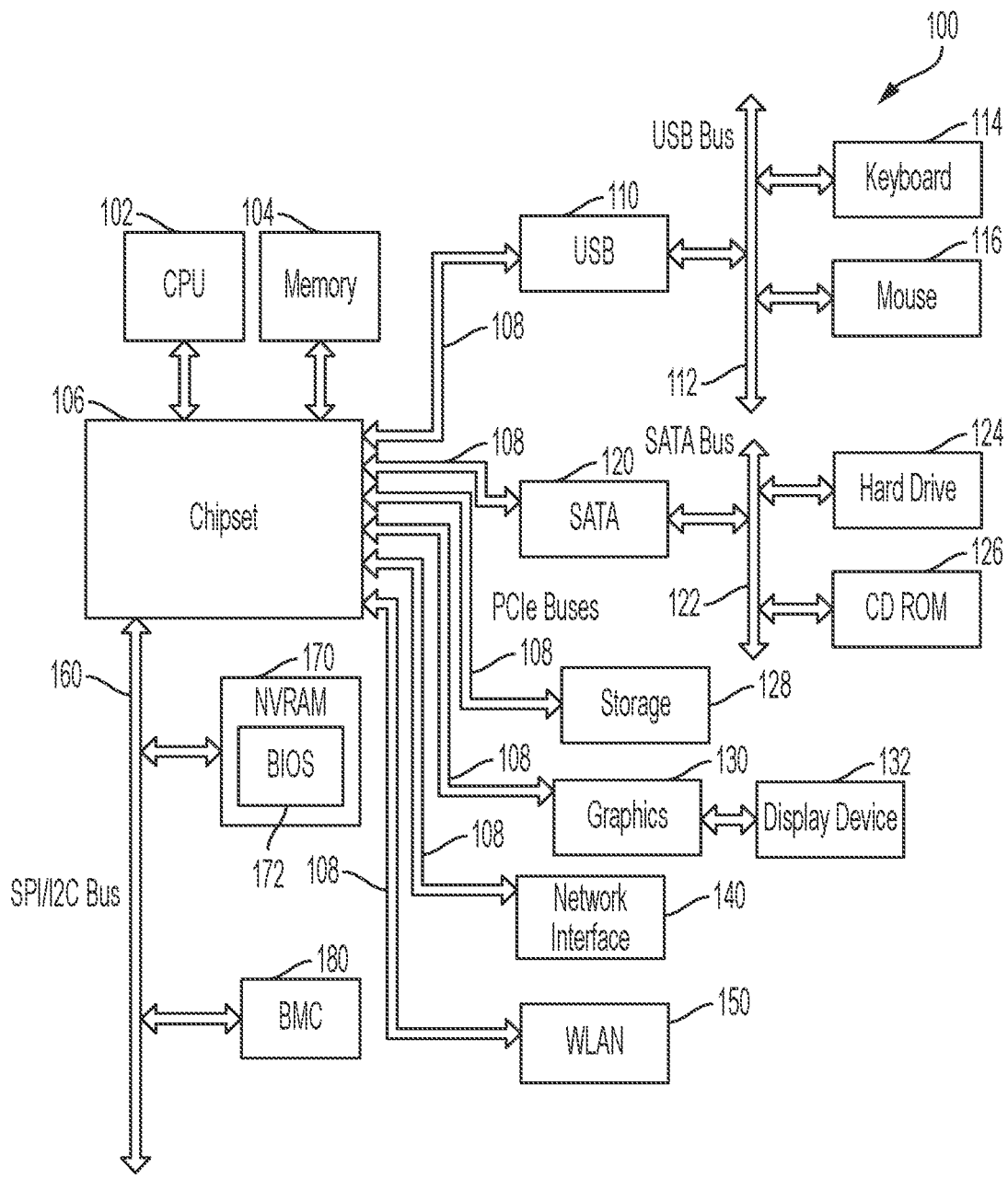
FIG. 1 is a block diagram of an example information handling system according to some embodiments of the disclosure.

FIG. 1 illustrates an example information handling system 100. Information handling system 100 may include a processor 102, a memory 104, a chipset 106, one or more PCIe buses 108, a universal serial bus (USB) controller 110, a USB bus 112, a keyboard device controller 114, a mouse device controller 116, a configuration a SATA bus controller 120, a SATA bus 122, a hard drive device controller 124, a compact disk read only memory (CD ROM) device controller 126, a storage 128, a graphics device controller 130, a network interface controller (NIC) 140, a wireless local area network (WLAN) or wireless wide area network (WWAN) controller 150, a serial peripheral interface (SPI) bus 160, a NVRAM 170 for storing BIOS 172, and a baseboard management controller (BMC) 180. In one example embodiment, chipset 106 may be directly connected to an external end point via a PCIe root port within the chipset and a point-to-point topology as shown in FIG. 1. BMC 180 may be referred to as a service processor or embedded controller (EC). Capabilities and functions provided by BMC 180 may vary considerably based on the type of information handling system. For example, the term baseboard management system may be used to describe an embedded processor included at a server, while an embedded controller may be found in a consumer-level device. As disclosed herein, BMC 180 represents a processing device different from CPU 102, which provides various management functions for information handling system 100. For example, an embedded controller may be responsible for power management, cooling management, and the like. An embedded controller included at a data storage system may be referred to as a storage enclosure processor or a chassis processor.

System 100 may include additional processors that are configured to provide localized or specific control functions, such as a battery management controller. Bus 160 can include one or more busses, including a SPI bus, an I2C bus, a system management bus (SMBUS), a power management bus (PMBUS), and the like. BMC 180 can be configured to provide out-of-band access to devices at information handling system 100. As used herein, out-of-band access herein refers to operations performed prior to execution of BIOS 172 by processor 102 to initialize operation of system 100.

BIOS 172 may include instructions executable by CPU 102 to initialize and test the hardware components of system 100, and to load a boot loader or an operating system (OS) from a mass storage device. BIOS 172 additionally may provide an abstraction layer for the hardware, such as a consistent way for application programs and operating systems to interact with the keyboard, display, and other input/output devices. When power is first applied to information handling system 100, the system may begin a sequence of initialization procedures, such as a BIOS boot procedure. During the initialization sequence, also referred to as a boot sequence, components of system 100 may be configured and enabled for operation, and device drivers may be installed. Device drivers may provide an interface through which other components of the system 100 can communicate with a corresponding device. BIOS, as used herein, may also refer to a unified extensible firmware interface (UEFI). BIOS 172 may also include one or more firmware modules of the information handling system. For example, one or more firmware modules of the information handling system 100 may be stored in NVRAM 170. Additionally configuration settings for the BIOS 172 and firmware of the information handling system 100 may be stored in the NVRAM 170. NVRAM 170 may, for example, be a nonvolatile firmware memory of the information handling system 100 and may store a firmware memory map namespace 100 of the information handling system. NVRAM 170 may further store one or more container-specific firmware memory map namespaces for one or more containers concurrently executed by the information handling system.

Information handling system 100 may include additional components and additional busses, not shown for clarity. For example, system 100 may include multiple processor cores, audio devices, and the like. While a particular arrangement of bus technologies and interconnections is illustrated for the purpose of example, one of skill will appreciate that the techniques disclosed herein are applicable to other system architectures. System 100 may include multiple CPUs and redundant bus controllers. One or more components may be integrated together. For example, portions of chipset 106 can be integrated within CPU 102. Additional components of information handling system 100 may include one or more storage devices that may store machine-executable code, one or more communications ports for communicating with external devices, and various input and output (I/O) devices, such as a keyboard, a mouse, and a video display.

In some embodiments, CPU 102 may include multiple CPUs, such as multiple processing cores for parallel processing by the information handling system 100. For example, the information handling system 100 may include a server comprising multiple CPUs for parallel processing. In some embodiments, the information handling system 100 may support virtual machine (VM) operation, with multiple virtualized instances of one or more operating systems executed in parallel by the information handling system 100. For example, resources, such as CPUs or processing cores of the information handling system may be assigned to multiple containerized instances of one or more operating systems of the information handling system 100 executed in parallel. A container may, for example, be a virtual machine executed by the information handling system 100 for execution of an instance of an operating system by the information handling system 100. Thus, for example, multiple users may remotely connect to the information handling system 100, such as in a cloud computing configuration, to utilize resources of the information handling system 100, such as memory, CPUs, and other hardware, firmware, and software capabilities of the information handling system 100. Parallel execution of multiple containers by the information handling system 100 may allow the information handling system to execute tasks for multiple users in parallel secure virtual environments.

Figure 2A:
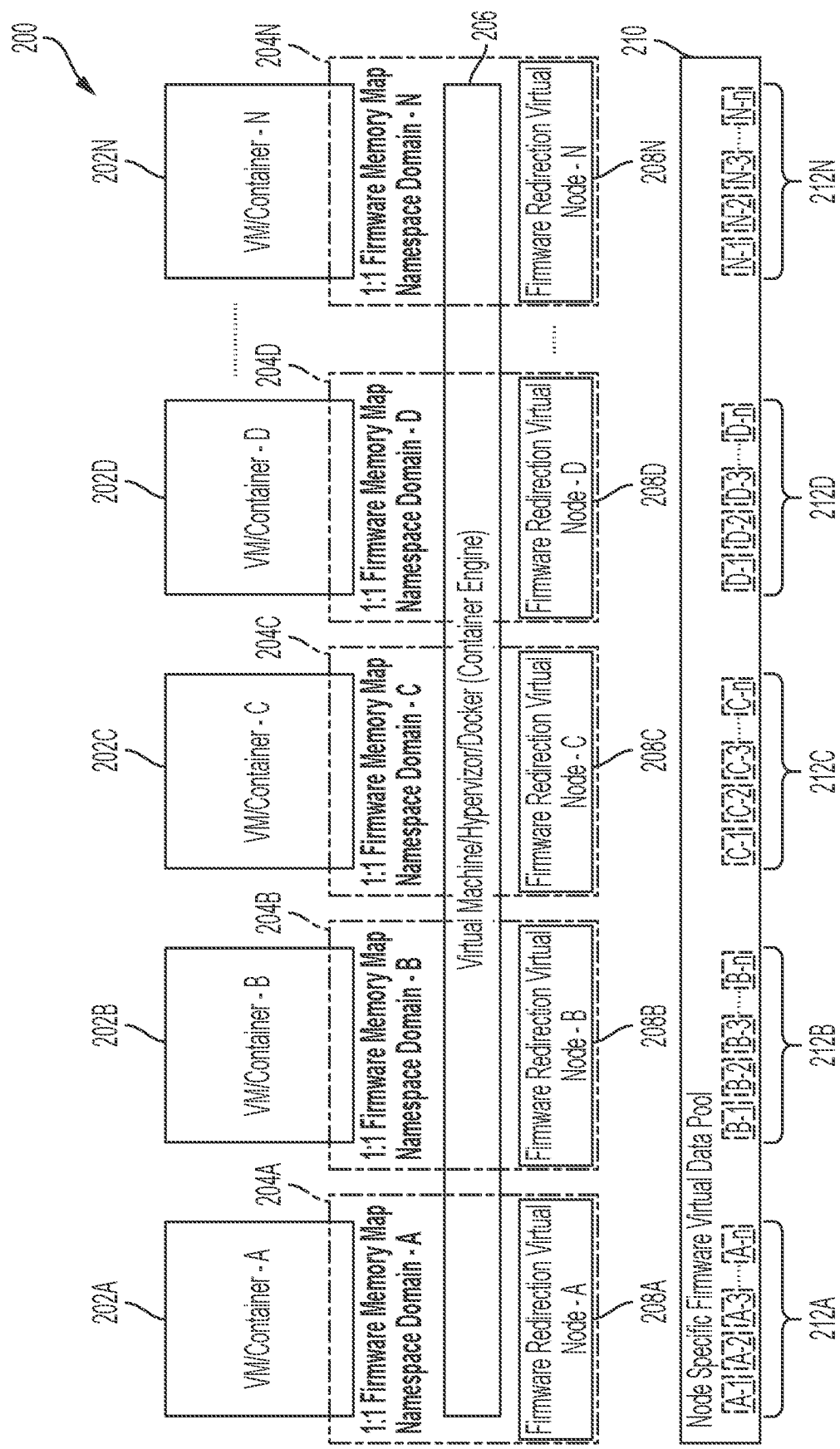
FIG. 2A is a first portion of a block diagram of an example system for firmware memory map namespaces for concurrently executed virtual containers according to some embodiments of the disclosure.
Figure 2B:
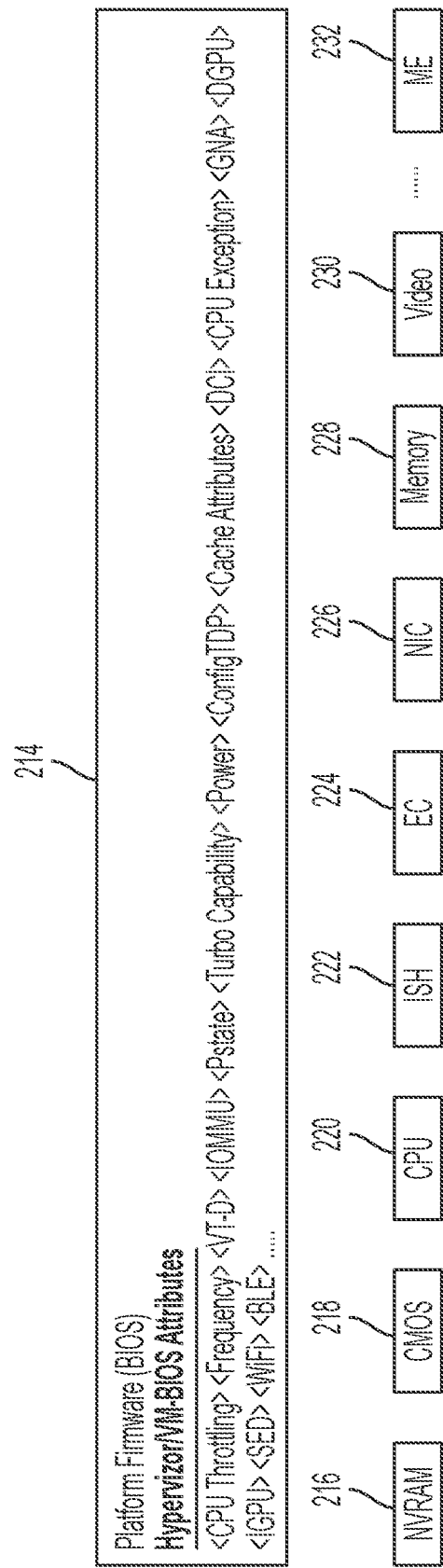
FIG. 2B is a second portion of a block diagram of an example system for firmware memory map namespaces for concurrently executed virtual containers according to some embodiments of the disclosure.

An information handling system 200 may execute multiple virtual machines and/or containers 202A-N concurrently, as shown in FIGS. 2A-2B. Containers 202A-N executed in parallel by an information handling system 200 may have varying demands for firmware settings. For example, a first container 202A executed by an information handling system 200 may require throttling of a CPU 220 of the information handling system 200, while a second container 202B executed by the information handling system 200 may require an absence of throttling of a CPU 220 of the information handling system 200. Such varying demands on firmware settings, such as CPU throttling, CPU frequency, VT-D configuration, IOMMU configuration, P-state configuration, TPD configuration, cache configuration, DCI configuration, CPU exception configuration, GNA configuration, DGPU configuration, IGPU configuration, SED configuration, Wi-Fi configuration, Bluetooth configuration, and other firmware settings may cause conflicts if an information handling system is not configured to support discrete firmware setting configurations for each concurrently executed virtual container. For example, if first container 202A configures a CPU throttling attribute of a BIOS of the information handling system 200, that applies to all containers 202A-N executed by the information handling system 200, to implement throttling, while another container 202B requires an absence of throttling, the throttling implemented across the entire information handling system 200 may cause container 202B to reset, or even hang, resulting in reboot of the whole information handling system 200. Such resetting or hanging can negatively impact a user experience by increasing system downtime. Furthermore, allowing a first container 202A to overwrite firmware parameters that apply to other containers can negatively impact a security of an information handling system 200 by allowing access to memory contents, such as contents of a firmware memory namespace of an information handling system 200 that may impact the security of other containers 202B-N executed by the information handling system.

A one-to-one firmware memory map namespace, however, may allow for secure allocation of portions of a firmware memory namespace, such as portions of a firmware NVRAM namespace, to multiple concurrently executed containers 202A-N of an information handling system 200. The concurrently executed containers 202A-N may thus be allocated portions of a firmware memory for storage of individualized firmware settings for each container 202A-N. Such settings may be used by the information handling system 200 and containers 202A-N to configure firmware parameters specific to each container without impacting firmware parameters specific to other containers. For example, a first container 202A may be allocated a first one-to-one firmware memory map namespace domain 204A. A firmware redirection virtual node 208A may map container-specific firmware setting sets 212A, such as sets of node-specific virtual data pool objects, of a node-specific firmware virtual data pool 210 for the first container 202A. Likewise, additional containers 202B-N may be allocated one-to-one firmware memory map namespace domains 204B-N, with firmware redirection virtual nodes 208B-N to map container-specific firmware setting sets 212B-N, such as node-specific virtual data pool object sets, to their respective containers 202B-N. The firmware redirection virtual nodes 208A-N may, for example, be generated to provide pre-boot containers, such as containers 202A-N, with specific BIOS attribute mappings. The use of firmware redirection virtual nodes may allow firmware parameters to be set on a container-specific basis with multiple hardware configurations, such as multiple variations of underlying platform hardware.

A node-specific firmware virtual data pool 210 may be stored on in a firmware NVRAM of the information handling system 200 and may include multiple sets of firmware settings 212A-N, for each container 202A-N. The firmware settings of the sets of firmware settings 212A-N may, for example, be virtual firmware container objects for the containers 202A-N, providing one-to-one virtual control of multiple firmware parameters, such as BIOS parameters, for each container 202A-N. For example each set of firmware settings 212A-N may include firmware settings, such as such as CPU throttling settings, CPU frequency settings, VT-D settings, IOMMU settings, P-state settings, TPD settings, cache settings, DCI settings, CPU exception settings, GNA settings, DGPU settings, IGPU settings, SED settings, Wi-Fi settings, Bluetooth settings, and other firmware settings, specific to the container 202A-N with which the set of firmware settings 212A-N is associated via the firmware redirection virtual nodes 208A-N. Thus, each container 202A-N may be allocated a portion of a firmware memory, such as a portion of a node-specific firmware virtual data pool 210 for storage of one or more firmware settings specific to each respective container 202A-N. A container engine 206, which may also be referred to as a virtual machine engine, hypervisor engine, or docker engine, may coordinate operation of the concurrently executed containers 202A-N, such as allocating resources to each container 202A-N and coordinating adjustment of container-specific firmware parameters.

The firmware settings of the sets of firmware settings 212A-N may correspond to firmware parameters of the information handling system such as platform firmware parameters 214 of a BIOS of an information handling system, as shown in FIG. 2B, such as hypervisor or BIOS virtual machine attributes. FIG. 2B shows a second portion of an information handling system 200 that may execute multiple virtual machines and/or containers 202A-N concurrently. Each object, or firmware setting, of the node-specific firmware virtual data pool 210 may implement a globally unique identifier (GUID)-based mapping between an actual BIOS attribute of BIOS attributes 214 stored in a firmware NVRAM of the information handling system 200 and the container-specific firmware setting. The firmware parameters may be stored in a third portion of the firmware NVRAM different from the firmware memory map namespaces in which the first and second sets of firmware settings for each of the respective containers are stored. In some embodiments, a hosted operations support system/business support system (HOB) data channel may be generated during a pre-extensible firmware interface (PEI) boot phase for the firmware settings, or objects, contained in the virtual data pool 210, which may be mapped based on corresponding container 202A-N namespace identifiers. The HOB may, for example, be a one-way data channel for passing data from a PEI boot phase to a driver execution environment (DXE) boot phase. The virtual data pool 210 may be SoC-agnostic, and may thus function with many different system configurations, including firmware settings that correspond to hardware components of the information handling system, such as a frequency of a CPU of the information handling system.

As one example, a first firmware setting of a set of firmware settings 212A of a first container 203A may provide one-to-one virtual control of a frequency of a CPU, such as a processing core, allocated to the first container 202A. A second, corresponding, firmware setting of a second set of firmware settings 212B of a second container 202B may provide one-to-one virtual control of a frequency of a different CPU, such as a processing core, allocated to the second container 202B. Thus, the firmware settings 212A-N of the node-specific firmware virtual data pool 210 may provide the containers 202A-N with control of firmware configuration parameters 214 that correspond to the containers 202A-N. Through the one-to-one virtual control provided by the firmware settings 212A-N, each container 202A-N may adjust firmware parameters 214, such as BIOS parameters, that pertain to each container 202A-N, and may thus adjust operation of an NVRAM 216, a complementary metal-oxide semiconductor (CMOS) memory, a CPU, an integrated sensor hub 222, an embedded controller (EC) 224, a network interface card (NIC) 226, a memory 228, a video card 230, such as a graphics card, a management engine 232, and other information handling system hardware, software, and firmware components. Such adjustments may be made without impacting overall system firmware parameters, and thus negatively impacting performance of other containers executed by the information handling system. For example, instead of adjusting an overall throttling of all processing cores of the information handling system, such as by setting a static system-on-a-chip (SoC) throttling, a container 202A may, through a first firmware setting of a set of firmware settings 212A for the first container, adjust a throttling of only a processing core, such as a throttling of CPU 220, allocated to the first container 202A, without adjusting throttling of other processing cores of the information handling system 200. Thus, firmware parameters, such as CPU throttling, CPU frequency VT-D configuration, IOMMU configuration, P-state, and other parameters, may be controlled specific to each concurrently executed container 202A-N, rather than exclusively by system-wide configurations. Furthermore, virtual data pool management services may be defined at runtime for dynamic container needs.

In some embodiments, the container engine 206 may implement an abstract service to handle operations of the node-specific firmware virtual data pool such as prioritization and arbitration with respect to shared hardware, firmware, and software resources of the information handling system, within containers 202A-N, as well as across containers 202A-N. Containers 202A-N may, for example, require firmware support to perform spatial isolated operations, and a boot-time method may be implemented by the system 300 to create GUID-based virtual NVRAM regions for firmware parameters, such as firmware container objects in container-specific namespaces of a firmware memory of the information handling system.

Container-specific firmware settings, as disclosed herein, can also allow for container-specific rollback of firmware versions. In some cases, if a firmware for a container of an information handling system encounters one or more errors in response to an update to the firmware, the information handling system may roll back the firmware for all containers to a last known good version to attempt to remedy the errors. For example, if a user of an information handling system with multiple concurrently executed containers rolls back a version of a BIOS due to security vulnerabilities and/or firmware issues with a current version of the BIOS with respect to a first container, rolling back the BIOS to a previous version for all containers executed by the information handling system may re-introduce errors and/or conflicts that the previous version of the BIOS has with one or more other containers of the information handling system. Use of container-specific firmware versioning through use of container-specific firmware memory map namespaces, as disclosed herein, may minimize such issues.

Figure 3:
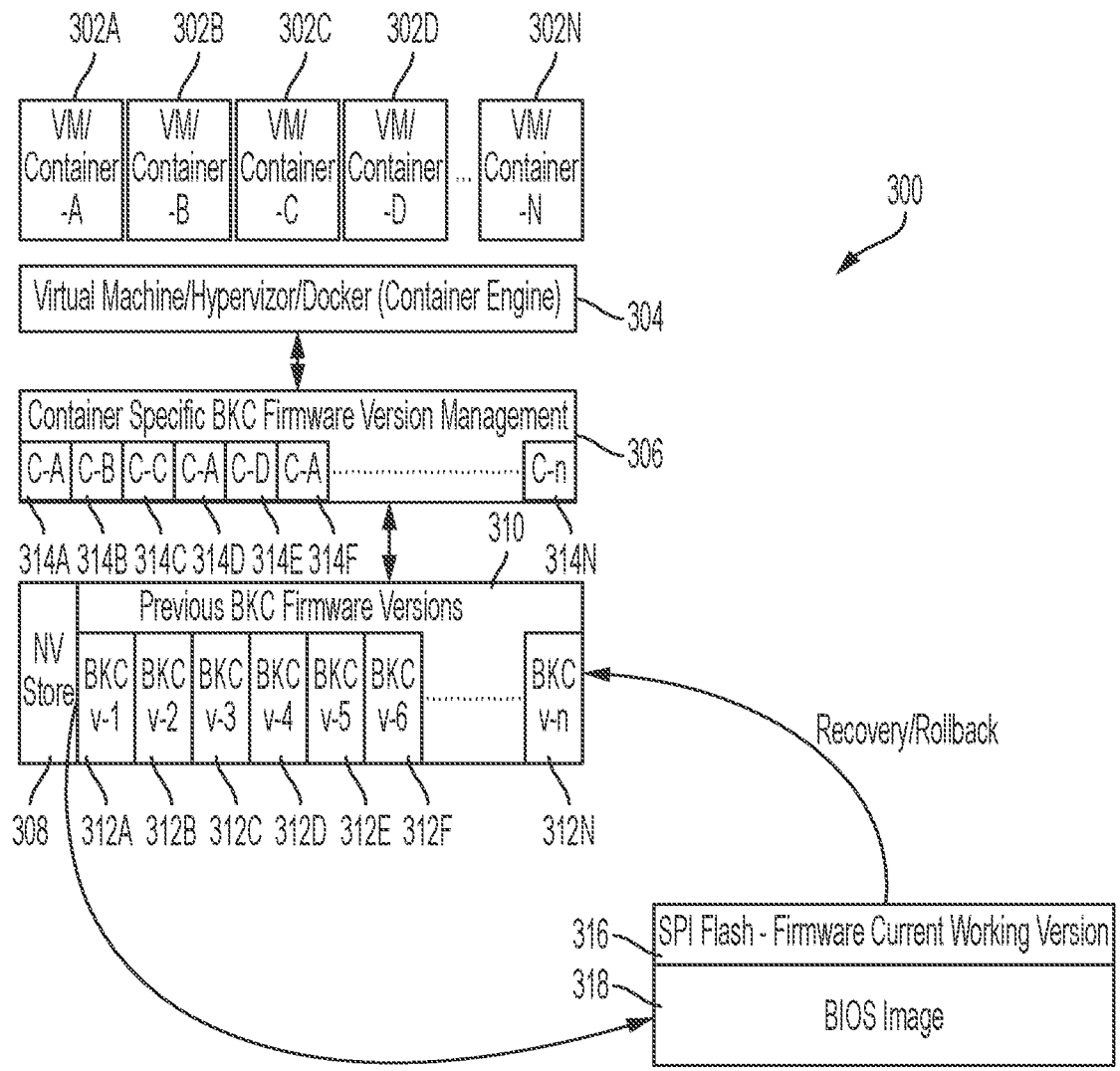
FIG. 3 is a block diagram of an example system for container-specific firmware rollback according to some embodiments of the disclosure.

Firmware versioning dependencies of containers may be resolved by use of virtual NVRAM regions exposed to containers 302A-N as NVRAM namespaces by providing a platform NVRAM namespace policy protocol for individual container access to firmware versioning information. For example, a container engine 304 may provide containers 302A-N with firmware versioning information regarding previous firmware images, such as previous BIOS images, of the information handling system that encountered no, or fewer, errors specifically identified for each container 302A-N. As shown in FIG. 3, multiple firmware images 312A-N, such as BIOS reference code firmware version images, stored in a NVRAM 308 of an information handling system, may be tagged 314A-N as container-specific best known configurations for the containers 302A-N executed by the information handling system 300. A container-specific best known configuration firmware version management engine 306 may include one or more tags 314A-N identifying best known configuration firmware versions for each container 302A-N, and may provide a container, such as through container engine 304, with a best known configuration if a firmware rollback is desired. A best known configuration for a container may, for example, include a reference code versioned BIOS image and/or one or more container-specific firmware settings. As one example, if a BIOS for an information handling system 300 concurrently executing containers 302A-N is updated, a BIOS executed by the containers 302A-N may be updated. However, if a container 302A encounters errors after the BIOS is updated, or receives an instruction by a user to roll back a version of a BIOS executed by the container, the container 302A may, through the container-specific best known configuration firmware version management engine 306, load and execute a prior firmware version 312A, such as a prior BIOS reference code image, tagged as a best known configuration for that container 302A. The remaining containers 302B-N, if they do not encounter errors and/or receive instructions to roll back their firmware, may continue to execute the updated firmware. In some embodiments, a second container 302B may, for example, be tagged to a different best known configuration firmware version 312B from the first container 302A, and may thus roll back to a different firmware version 312B if a determination is made to roll back the firmware of the second container 302B. An information handling system may thus roll back a firmware version of a container 302A, without interrupting operation of other containers 302B-N concurrently executed by the information handling system. Rolling back a firmware version may, for example, also include rolling back one or more firmware settings, such as one or more container-specific firmware settings, for the container. In some embodiments, rolling back a firmware image for a container 302A may include loading a BIOS image 318 for a container 302A from a firmware flash memory 316, such as a serial peripheral interface flash memory. For example, each previous firmware image 312A-N may be stored in a firmware memory 316, or may be loaded to a firmware memory 316, when a firmware version of a container is rolled back to the previous firmware version.

In some embodiments, the container-specific best known configuration firmware version management engine 306 may include multiple tags 314A-N, tagging specific containers 302A-N to specific firmware version images 312A-N, such as specific BIOS reference code version images. Thus, if a BIOS of an information handling system executing the containers 302A-N is updated due to security vulnerabilities and/or firmware issues, different firmware versions for one or more of the containers 302A-N may be loaded to avoid best known configuration mismatch and/or container boot issues. A boot time method may be used to create GUID-based virtual NVRAM regions for firmware versions 312A-N on the memory 308, and a platform NVRAM namespace policy protocol may be used to provide access to the firmware versions stored in the memory 308. For example, common PCIe drivers to multiple containers can load with default values, but based on container-specific data, such as container-specific firmware settings, PCIe drivers can enumerate I/O attributes differently for each container. Versioning for firmware, such as firmware components, of the information handling system may be useful to facilitate update and rollback scenarios to retain or load default values for newly introduced attributes for each container, such as additional firmware settings added in a firmware update.

Figure 4:
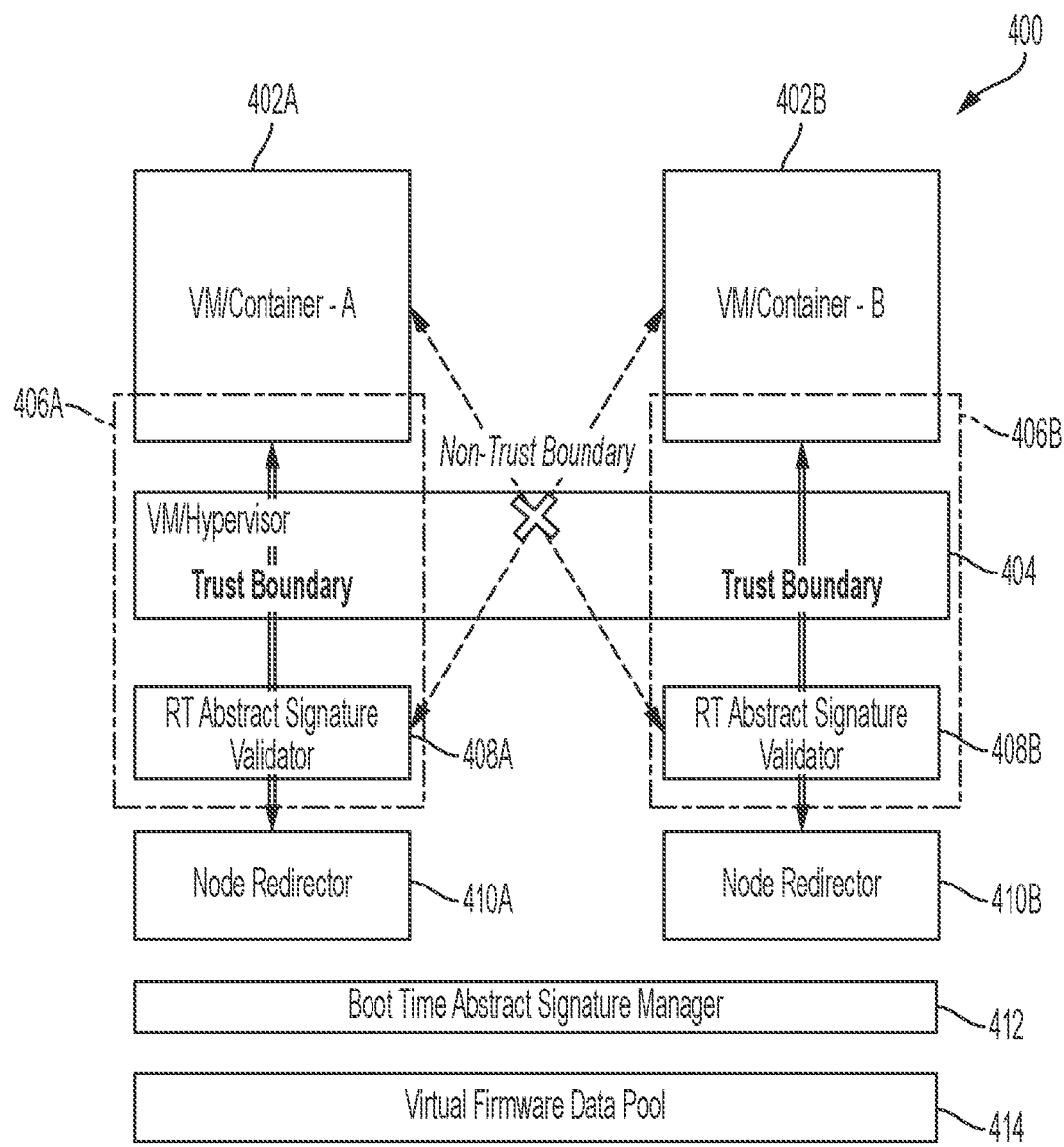
FIG. 4 is a block diagram of a system for verification of container signatures for accessing container-specific firmware memory map namespaces according to some embodiments of the disclosure.

In order to provide enhanced security when implementing container-specific firmware memory map namespaces, an information handling system may require verification of a signature of a container executed by the information handling system before granting the container access to the contents of the container-specific firmware memory map namespace allocated to the container, such as access to the firmware configuration settings of the container. An example system 400 for secure container-specific firmware memory map namespace access is shown in FIG. 4. The system 400 may be executed by an information handling system. An information handling system may concurrently execute a first container 402A and a second container 402B. Trust boundaries 406A-B may be implemented for the containers 402A-B such that the first container 402A may not access firmware configuration settings of the second container 402B and the second container 402B may not access firmware configuration settings of the first container 402A. Such a trust boundary may be established through use of a run-time abstract signature validating service and generation of trusted abstract container signatures at boot time. For example, container-specific signatures may be generated by an information handling system at boot time when a container is installed to align the trust boundary only against a specific abstract hash identified for the container.

A first container 402A may access a node redirector 410A using a container engine 404, such as a virtual machine engine or a hypervisor engine. A trust boundary 406A may incorporate the first container 402A, the container engine 404, and a run-time abstract signature validator 408A to facilitate security of the container 402A in communicating with the node redirector 410A. The node redirector 410A may redirect the first container 402A to a node-specific firmware virtual data pool 414, such as to a portion of a memory of the information handling system storing one or more firmware settings for the first container 402A. Before the first container is redirected to the portion of the memory storing the firmware settings of the first container, a run-time abstract signature validator 408A may validate a signature of the first container. If the signature of the first container 402A is not validated, the first container 402A may not be allowed to access the node redirector 410A for the first container 402A, and thus may not be allowed to access the firmware settings for the first container 402A, such as firmware settings for the first container 402A stored in the virtual firmware data pool 414. The run time abstract signature validator 408B for the second container 402B may similarly govern access of the container 402B to firmware settings for the second container 402B stored in the virtual firmware data pool 414. A namespace of the virtual firmware data pool 414 for each container 402A-B may be protected by container-specific signatures for unlocking an area of a memory of the information handling system, such as an NVRAM of the information handling system, allocated to each container 402A-B. For example, based on I/O data a peripheral component interconnect express (PCIe) driver for a container 402A may be re-initialized for every container need. Furthermore, a signatures may also be validated by run-time abstract signature validators 408A-B when information is provided to the containers 402A-B from container-specific firmware namespaces, such as portions of a firmware NVRAM allocated to each container 402A-B for storage of firmware settings.

A boot time abstract signature manager 412 may generate signatures for the containers 402A-B when the containers are installed. Thus, a trust boundary 406A for the first container 402A may be aligned only against an abstract hash specifically generated for the first container 402A, and a trust boundary 406B for the second container 402B may be aligned only against an abstract hash specifically generated for the second container 402B.

Figure 5:
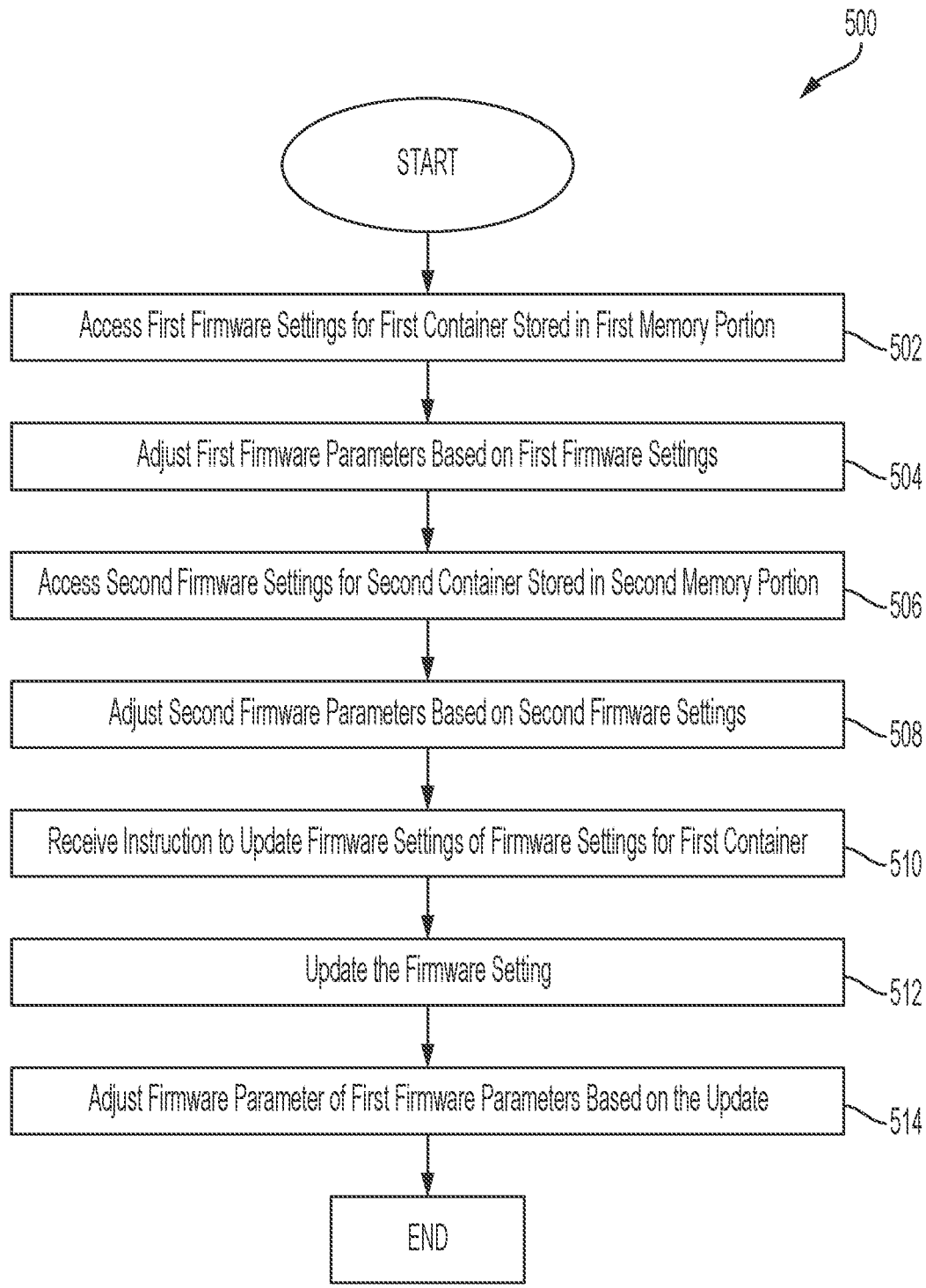
FIG. 5 is a flow chart of an example method for adjustment of firmware parameters based on container-specific firmware settings according to some embodiments of the disclosure.

An information handling system may store firmware settings for multiple concurrently executed containers of the information handling system in separate portions of a firmware memory of the information handling system, to allow multiple concurrently executed containers to implement firmware settings specific to each container without overwriting firmware settings of other concurrently executed containers. An example method 500 for adjustment of firmware parameters for first and second concurrently executed containers based on firmware settings specific to the first and second concurrently executed containers is shown in FIG. 5. The method 500 may begin, at step 502, with accessing one or more first firmware settings for a first container stored in a first portion of a first memory of the information handling system. The first memory may, for example, be a firmware memory, such as a SPI flash NVRAM of the information handling system. For example, the first portion of the first memory may be a firmware memory map namespace of the first container. A firmware redirection virtual node may direct the container to the one or more objects of a node specific firmware virtual data pool, such as one or more firmware settings. The one or more firmware settings may, for example, include CPU throttling settings, CPU frequency settings, VT-D settings, IOMMU settings, P-state settings, TPD settings, cache settings, DCI settings, CPU exception settings, GNA settings, DGPU settings, IGPU settings, SED settings, Wi-Fi settings, Bluetooth settings, and other firmware settings. Thus, first firmware settings for a first container executed by an information handling system, stored in a portion of a memory allocated to the first container, may be accessed by the information handling system.

The information handling system may, at step 504, adjust one or more first firmware parameters of the information handling system based on the first firmware settings. For example, the first container may adjust one or more first firmware parameters related to the first container based on the one or more first firmware settings. The one or more first firmware parameters may, for example, be firmware parameters for one or more resources, such as hardware, software, and firmware components of the first information handling system, allocated to the first container, such as one or more firmware parameters for one or more CPUs, memories, graphics processors, or other hardware devices allocated to the first container. The first firmware parameters may be stored in a third portion of a memory, such as a firmware NVRAM, of the information handling system, different from the first and second portions of the memory in which the first and second firmware settings for the first and second containers are stored. In some embodiments, the memory in which the firmware parameters are stored may be a different memory entirely from a memory in which the first and second firmware settings are stored. The firmware parameters may, in some embodiments, comprise BIOS parameters, which may also be referred to as BIOS attributes. In some embodiments, the one or more first firmware parameters may include CPU throttling parameters, CPU frequency parameters, VT-D parameters, hyperthreading parameters, hybrid core parameters, PCIe parameters, non-uniform memory access (NUMA) parameters, IOMMU parameters, P-state parameters, TPD parameters, cache parameters, DCI parameters, CPU exception parameters, GNA parameters, DGPU parameters, IGPU parameters, SED parameters, Wi-Fi parameters, Bluetooth parameters, and other firmware parameters. Such firmware parameters, may, for example, be firmware parameters for resources, such as hardware components including CPUs, PCIe devices, memories, caches, DGPUs, IGPUs, Wi-Fi devices, Bluetooth devices, and other information handling system components allocated for use by the first container. The parameters may, for example, be parameters specifically associated with the first container, such as a throttling or frequency of a CPU allocated to the first container, rather than parameters of the information handling system as a whole, such as a system-wide throttling or frequency that may impact CPUs allocated to other containers executed by the information handling system. In some embodiments, the firmware settings for the first container, accessed at step 502, may be one to one mapped to firmware parameters, of step 504, and may provide the first container with one to one virtual control of such parameters. For example, each firmware setting may include a GUID, mapping the parameter to one or more container-specific firmware settings, such as a frequency of one or more CPUs allocated to the container. Thus, the firmware parameters of the first container may be used by the first container to adjust firmware settings associated with the first container, such as operational parameters of resources allocated to the first container.

At step 506, the information handling system may access one or more second firmware settings stored in a second portion of the first memory of the information handling system. The first memory may, for example, be a firmware memory, such as a SPI flash NVRAM of the information handling system. The second portion of the memory may be separate from the first portion of the memory. In some embodiments, the first and second portions of the memory may be protected, such as by using abstract signatures, to prevent the first container from accessing firmware settings of the second container and to prevent the second container from accessing firmware settings of the first container. The one or more second firmware settings may, for example, be similar to the one or more first firmware settings, although values, such as different throttling values or different CPU frequencies, may differ between firmware setting sets for different containers. The second container may be executed concurrently with the first container. In some embodiments, a memory of an information handling system may include sets of firmware settings, in allocated memory portions, for more than two concurrently executed containers.

At step 508, one or more firmware parameters of the second container may be adjusted based on the one or more second firmware settings of the second container. The one or more firmware parameters for the second container may, for example, be one or more second firmware parameters for one or more resources, such as hardware, software, and firmware components, allocated to the second container. For example, firmware parameters specific to the second container, such as a CPU frequency of a CPU allocated to the second container, may be adjusted based on the one or more firmware settings. The one or more second firmware parameters of the second container may function similarly to the one or more first firmware parameters of the first container. The second firmware parameters may, for example, be stored in the third portion of a memory along with the first firmware parameters. Thus, the one or more first firmware parameters may be adjusted separately from the one or more second firmware parameters, and firmware parameters specific to a container may be adjusted without impacting firmware parameters of a different concurrently executed container. Such separate adjustment of firmware parameters may allow firmware parameters of a first container to be securely adjusted without impacting performance of a second concurrently executed container, such as causing the second container to reset or even hang and trigger a full information handling system reboot.

In some embodiments, a user of the information handling system, such as a user of the first container, may instruct the information handling system to update one or more firmware settings of the one or more first firmware settings for the first container. For example, a user of the first container, such as a remote user, may transmit a message instructing the information handling system to adjust a firmware setting, such as to increase a CPU frequency, for the first container. At step 510, the first information handling system may receive an instruction to update one or more firmware settings of the first firmware settings for the first container. At step 512, the information handling system may update the firmware setting. In some embodiments, the first container may access the portion of the memory allocated to the first container and may adjust values of one or more firmware settings according to the received instruction. For example, the first container may access one or more objects, such as one or more firmware settings, of a first portion of a node specific firmware virtual data pool allocated to the first container to adjust values of the one or more objects. At step 514, the information handling system may adjust one or more firmware parameters of the first information handling system associated with the first container based on the update to the firmware setting. For example, if a firmware setting for a CPU frequency of a CPU allocated to the first container is increased in the update, a CPU frequency of the CPU allocated to the first container may be increased. Thus, a user of a container, or a user of the information handling system such as an administrator, may adjust firmware settings of a first container and, by extension, firmware parameters for the first container.

Figure 6:
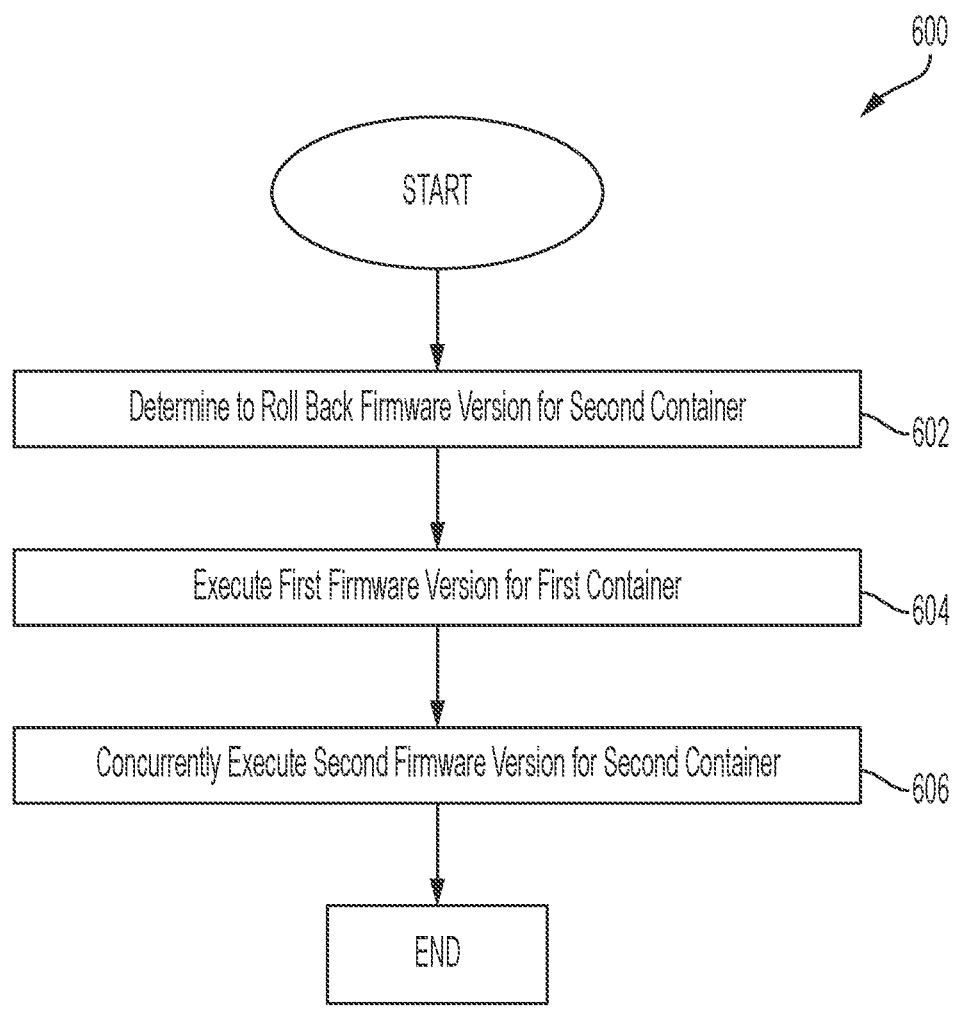
FIG. 6 is a flow chart of an example method for executing different firmware versions for concurrently executed containers according to some embodiments of the disclosure.

Concurrently executed containers of an information handling system may also be configured to execute different versions of a firmware of an information handling system, such as different reference code BIOS versions. For example, a first container of a first information handling system may load and execute a first BIOS image for a first reference code firmware version, while a second container of the first information handling system may load and execute a second BIOS image for a second reference code firmware version different from the first BIOS image. An example method 600 for execution of different firmware versions by concurrently executed containers of an information handling system is shown in FIG. 6. The method 600 may begin with determining to roll back a firmware version of a second container executed by the information handling system. For example, an information handling system with multiple concurrently executed containers may update a firmware of the information handling system and a firmware of one or more containers executed by the information handling system. The second container, however, may encounter errors following the firmware update, or the information handling system may receive an instruction from a user to roll back a firmware of the second container. As discussed with respect to FIG. 3, the information handling system may store previous firmware versions in an NVRAM of the information handling system, and, in some embodiments, sets of firmware settings for each container executed by the information handling system associated with each previous firmware version. A container specific firmware version management engine may manage firmware versions executed by the information handling system. In some embodiments, determining to roll back a firmware version of the second container may include determining to roll back a firmware version for the second container to a firmware version that previously functioned without errors for the second container, such as a best-known configuration firmware version. The firmware versions may, for example, be platform firmware versions, system firmware versions, device firmware versions, and other firmware versions.

At step 604, the information handling system may execute a first firmware version for a first container. For example, the information handling system may load and execute a first BIOS firmware reference code image for the first container, such as a current version of the BIOS. At step 606, the information handling system may load and execute the second firmware version for the second container. Such loading and execution may include loading a first set of firmware settings for the second container associated with the second firmware version. Thus, different firmware versions may be executed for different concurrently executed containers of an information handling system. Execution of different firmware versions for different containers of an information handling system may allow a current version of a firmware to be executed for a first container, when the first container does not encounter errors associated with the current version, while allowing a firmware version for a second container to be rolled back to a known good firmware if the second container encounters one or more errors. In some embodiments, the method 600 of FIG. 6 may be performed contemporaneously with or following the method 500 of FIG. 5.

Figure 7:
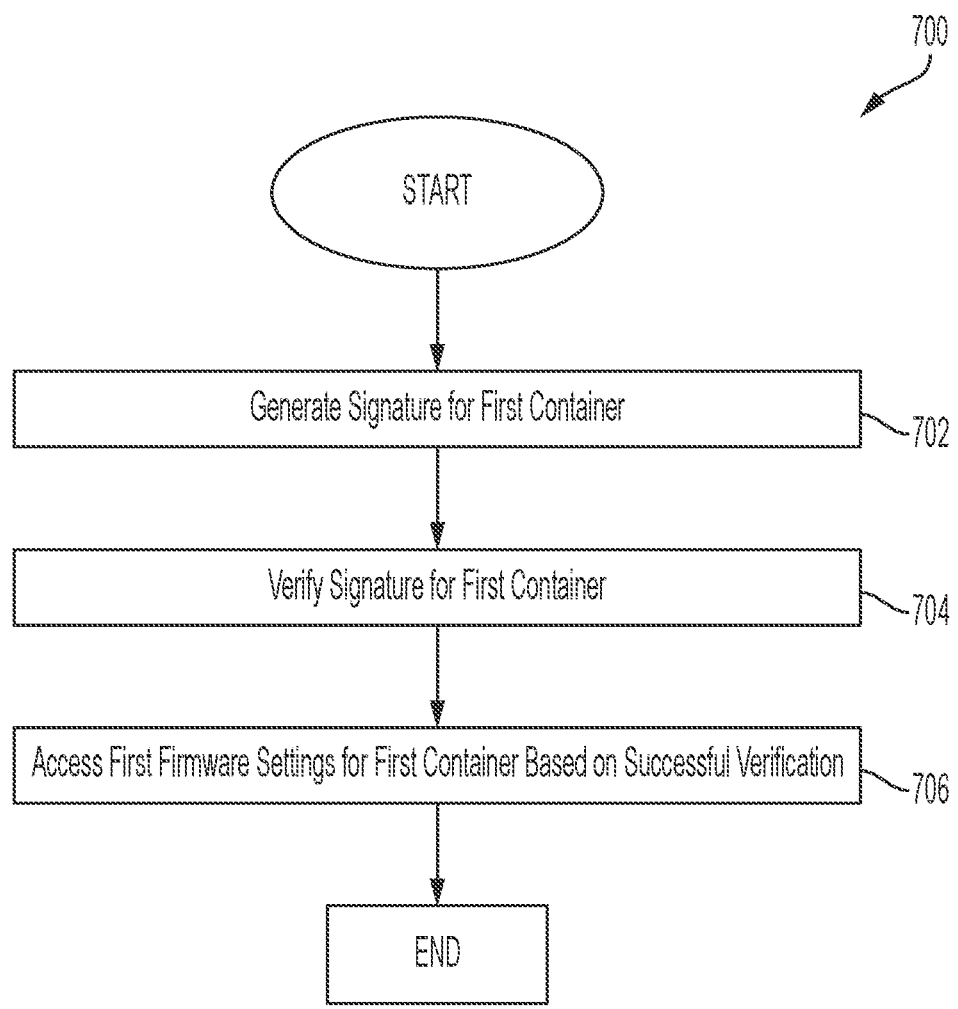
FIG. 7 is a flow chart of an example method for verifying a signature of a container for accessing a container-specific firmware memory map namespace according to some embodiments of the disclosure.

An information handling system may maintain security of portions of a memory allocated to concurrently executed containers for storage of container-specific firmware settings, such as portions of a node specific firmware virtual data pool containing container-specific firmware objects, by implementing abstract signature verification for access of the portions of the memory allocated to each of the concurrently executed containers. An example method 700 for signature verification when using container-specific firmware memory map namespaces is shown in FIG. 7. The method 700 may begin, at step 702, with generating a signature for a first container. For example, container-specific signatures may be generated and/or updated by an information handling system at boot time when a container is installed. The use of container-specific signatures for accessing portions of a memory allocated to containers for storage of container-specific storage parameters may create a trust boundary, preventing a first container from accessing firmware settings of a second, concurrently executed, container. For example, use of such signatures may protect container-specific firmware memory map namespaces from unauthorized access. The signature may be an abstract signature. In some embodiments, signatures for firmware containers may be generated and/or otherwise managed by a boot time abstract signature manager of the information handling system.

At step 704, the information handling system may verify the signature of the first container. For example, the first container may attempt to access an area of a memory of the information handling system, such as an area of a firmware NVRAM of the information handling system, allocated for storage of firmware settings of the first container. A run-time abstract signature validator of the information handling system may verify the signature of the first container before allowing the container to access the portion of the memory of the information handling system allocated to the first container. At step 706, the information handling system may access one or more first firmware settings for the first container stored in the first portion of the memory allocated for storage of firmware settings of the first container based on successful verification of the signature. For example, the abstract signature validator may allow the first container to access a portion of the first memory containing firmware settings for the first container using a node redirector following successful signature verification. If the signature of the first container is not successfully verified, the first container may be prevented from accessing the portion of the memory allocated to the first container. Thus, signatures, such as abstract hash value signatures, may be used to prevent unauthorized access of firmware settings of a plurality of concurrently executed containers.

In some embodiments, the methods 500, 600, and 700 may be performed prior to booting an operating system of the information handling system. Thus, containers may access and adjust firmware settings and parameters during a pre-boot stage of operation of the information handling system. In some embodiments, one or more runtime secure advanced configuration and power interface (ACPI) abstracted services may be defined to provide access of the containers to their associated firmware redirection virtual nodes in the pre-boot environment.

The flow chart diagrams of FIGS. 5-7 are generally set forth as logical flow chart diagrams. As such, the depicted order and labeled steps are indicative of aspects of the disclosed method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagram, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

If implemented in firmware and/or software, functions described above may be stored as one or more instructions or code on a computer-readable medium. Examples include non-transitory computer-readable media encoded with a data structure and computer-readable media encoded with a computer program. Computer-readable media includes physical computer storage media. A storage medium may be any available medium that can be accessed by a computer. By way of example, and not limitation, such computer-readable media can comprise random access memory (RAM), read-only memory (ROM), electrically-erasable programmable read-only memory (EEPROM), compact disc read-only memory (CD-ROM) or other optical disk storage, magnetic disk storage or other magnetic storage devices, or any other medium that can be used to store desired program code in the form of instructions or data structures and that can be accessed by a computer. Disk and disc includes compact discs (CD), laser discs, optical discs, digital versatile discs (DVD), floppy disks and Blu-ray discs. Generally, disks reproduce data magnetically, and discs reproduce data optically. Combinations of the above should also be included within the scope of computer-readable media.

In addition to storage on computer readable medium, instructions and/or data may be provided as signals on transmission media included in a communication apparatus. For example, a communication apparatus may include a transceiver having signals indicative of instructions and data. The instructions and data are configured to cause one or more processors to implement the functions outlined in the claims.

Although the present disclosure and certain representative advantages have been described in detail, it should be understood that various changes, substitutions and alterations can be made herein without departing from the spirit and scope of the disclosure as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the present disclosure, processes, machines, manufacture, compositions of matter, means, methods, or steps, presently existing or later to be developed that perform substantially the same function or achieve substantially the same result as the corresponding embodiments described herein may be utilized. Accordingly, the appended claims are intended to include within their scope such processes, machines, manufacture, compositions of matter, means, methods, or steps.

What is claimed is:

1. A method for concurrent container execution by an information handling system, comprising:
   accessing, by the information handling system, one or more first firmware settings stored in a first portion of a memory of the information handling system corresponding to a first namespace of the memory, wherein the one or more first firmware settings are first firmware settings for a first container executed by the information handling system, wherein the first portion is allocated to the first container;
   adjusting one or more first firmware parameters for one or more resources allocated to the first container based, at least in part, on the one or more first firmware settings, wherein the one or more first firmware parameters are stored in a portion of the memory that is different from the first portion of the memory, and wherein a setting of the one or more first firmware settings comprises an indicator of a location in the memory at which a firmware parameter of the one or more first firmware parameters associated with the setting is stored;
   accessing, by the information handling system, one or more second firmware settings stored in a second portion of the memory of the information handling system corresponding to a second namespace of the memory, different from the first portion of the memory of the information handling system, wherein the one or more second firmware settings are second firmware settings for a second container executed by the information handling system concurrently with the first container; and
   adjusting one or more second firmware parameters for one or more resources allocated to the second container based, at least in part, on the one or more second firmware settings.

2. The method of claim 1, wherein accessing the one or more first firmware settings comprises accessing, by the first container, a node-specific virtual data pool comprising the one or more first firmware settings using a firmware redirection virtual node.

3. The method of claim 1, wherein the one or more first firmware parameters comprise one or more first basic input/output system (BIOS) attributes.

4. The method of claim 3, wherein the setting of the one or more first firmware settings comprises the indicator of the location in the memory at which a BIOS attribute associated with the setting is stored.

5. The method of claim 3, wherein the one or more first BIOS attributes comprise at least one of: a central processing unit (CPU) throttling attribute, a frequency attribute, a virtualization technology for directed input/output (VT-D) attribute, an input-output memory management unit (IOMMU) attribute, a performance state (P-state) attribute, a turbo capability attribute, a power attribute, a configuration thermal design power (TDP) attribute, a cache attribute, a direct connect interface (DCI) attribute, a CPU exception attribute, a gaussian and neural accelerator (GNA) attribute, a dedicated graphics processing unit (DGPU) attribute, an integrated graphics processing unit (IGPU) attribute, a self-encrypting drive (SED) attribute, a WiFi attribute, or a Bluetooth attribute.

6. The method of claim 1, further comprising:
   receiving an instruction to update a firmware setting of the one or more first firmware settings;
   updating the firmware setting; and
   adjusting a firmware parameter of the one or more first firmware parameters for the first container based on the update to the first firmware setting without adjusting a corresponding firmware parameter of the one or more second firmware parameters of the second container.

7. The method of claim 1, further comprising:
   executing, by the information handling system for the first container, a first firmware version, wherein the first firmware version is stored in a third portion of the memory of the information handling system; and
   executing, by the information handling system for the second container, a second firmware version, wherein the second firmware version is different from the first firmware version, and wherein the second firmware version is stored in a fourth portion of the memory of the information handling system.

8. The method of claim 7, further comprising determining to roll back a firmware of the second container from the first firmware version to the second firmware version before executing, by the information handling system for the second container, the second firmware version, wherein the second firmware version is executed for the second container concurrently with execution, for the first container, of the first firmware version.

9. The method of claim 1, further comprising:
   verifying a signature of the first container before accessing the one or more first firmware settings,
   wherein accessing the one or more first firmware settings is based on verification of the signature of the first container.

10. An information handling system, comprising:
    a processor; and
    a memory,
    wherein the processor is configured to perform steps comprising:
       accessing one or more first firmware settings stored in a first portion of the memory of the information handling system corresponding to a first namespace of the memory, wherein the one or more first firmware settings are first firmware settings for a first container executed by the information handling system, wherein the first portion is allocated to the first container;
       adjusting one or more first firmware parameters for one or more resources allocated to the first container based, at least in part, on the one or more first firmware settings, wherein the one or more first firmware parameters are stored in a different portion of the memory that is different from the first portion of the memory, and wherein a setting of the one or more first firmware settings comprises an indicator of a location in the memory at which a firmware parameter of the one or more first firmware parameters associated with the setting is stored;
       accessing one or more second firmware settings stored in a second portion of the memory of the information handling system corresponding to a second namespace of the memory, different from the first portion of the memory of the information handling system, wherein the one or more second firmware settings are second firmware settings for a second container executed by the information handling system concurrently with the first container; and adjusting one or more second firmware parameters for one or more resources allocated to the second container based, at least in part, on the one or more second firmware settings.

11. The information handling system of claim 10, wherein accessing the one or more first firmware settings comprises accessing, by the first container, a node-specific virtual data pool comprising the one or more first firmware settings using a firmware redirection virtual node.

12. The information handling system of claim 10, wherein the one or more first firmware parameters comprise one or more first basic input/output system (BIOS) attributes.

13. The information handling system of claim 12, wherein the setting of the one or more first firmware settings comprises the indicator of the location in the memory at which a BIOS attribute associated with the setting is stored.

14. The information handling system of claim 12, wherein the one or more first BIOS attributes comprise at least one of: a central processing unit (CPU) throttling attribute, a frequency attribute, a virtualization technology for directed input/output (VT-D) attribute, an input-output memory management unit (IOMMU) attribute, a performance state (P-state) attribute, a turbo capability attribute, a power attribute, a configuration thermal design power (TDP) attribute, a cache attribute, a direct connect interface (DCI) attribute, a CPU exception attribute, a gaussian and neural accelerator (GNA) attribute, a dedicated graphics processing unit (DGPU) attribute, an integrated graphics processing unit (IGPU) attribute, a self-encrypting drive (SED) attribute, a Wi-Fi attribute, or a Bluetooth attribute.

15. The information handling system of claim 10, wherein the processor is further configured to perform steps comprising:
receiving an instruction to update a firmware setting of the one or more first firmware settings;
updating the firmware setting; and
adjusting a firmware parameter of the one or more first firmware parameters for the first container based on the update to the first firmware setting without adjusting a corresponding firmware parameter of the one or more second firmware parameters of the second container.

16. The information handling system of claim 10, wherein the processor is further configured to perform steps comprising:
executing, by the information handling system for the first container, a first firmware version, wherein the first firmware version is stored in a third portion of the memory of the information handling system; and
executing, by the information handling system for the second container, a second firmware version, wherein the second firmware version is different from the first firmware version, and wherein the second firmware version is stored in a fourth portion of the memory of the information handling system.

17. The information handling system of claim 16, wherein the processor is further configured to perform steps comprising: determining to roll back a firmware of the second container from the first firmware version to the second firmware version before executing, by the information handling system, the second firmware version, wherein the second firmware version is executed for the second container concurrently with execution, for the first container, of the first firmware version.

18. The information handling system of claim 10, wherein the processor is further configured to perform steps comprising:
verifying a signature of the first container before accessing the one or more first firmware settings,
wherein accessing the one or more first firmware settings is based on verification of the signature of the first container.

19. A computer program product, comprising:
a non-transitory computer readable medium, wherein the non-transitory computer readable medium comprises instructions for causing a processor to perform steps comprising:
accessing one or more first firmware settings stored in a first portion of a memory of an information handling system corresponding to a first namespace of the memory, wherein the one or more first firmware settings are first firmware settings for a first container executed by the information handling system, wherein at least a portion of the first portion is allocated to the first container;
adjusting one or more first firmware parameters for one or more resources allocated to the first container based, at least in part, on the one or more first firmware settings, wherein the one or more first firmware parameters are stored in a different portion of the memory that is different from the first portion of the memory, wherein the one or more first firmware parameters comprise one or more first basic input/output system (BIOS) attributes comprising a frequency of a central processing unit (CPU), and wherein a setting of the one or more first firmware settings comprises an indicator of a location in the memory at which the frequency of the CPU associated with the setting is stored;
accessing one or more second firmware settings stored in a second portion of the memory of the information handling system corresponding to a second namespace of the memory, different from the first portion of the memory of the information handling system, wherein the one or more second firmware settings are second firmware settings for a second container executed by the information handling system concurrently with the first container;
adjusting one or more second firmware parameters for one or more resources allocated to the second container based, at least in part, on the one or more second firmware settings;
determining a first firmware version among a plurality of firmware versions to roll back a firmware of the first container; and
determining to roll back the firmware of the first container to the first firmware version.

20. The computer program product of claim 19, wherein the non-transitory computer readable medium further comprises instructions for causing a processor to perform steps comprising:
receiving an instruction to update a firmware setting of the one or more first firmware settings;
updating the firmware setting; and
adjusting a firmware parameter of the one or more first firmware parameters for the first container based on the update to the first firmware setting without adjusting a corresponding firmware parameter of the one or more second firmware parameters of the second container.

* * * * *